A. E. CRANE.
HARVESTER FOR CABBAGE AND SIMILAR PLANTS.
APPLICATION FILED MAY 21, 1917.
1,241,198.
Patented Sept. 25, 1917.
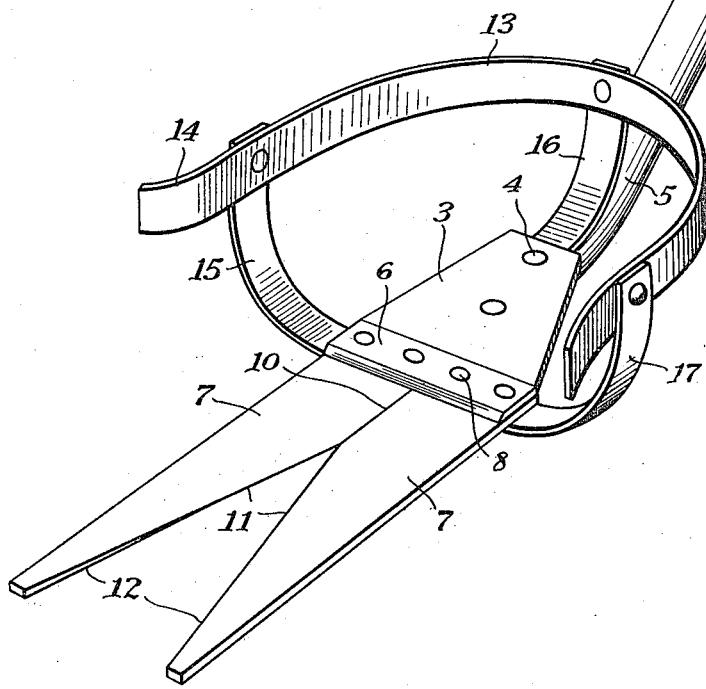
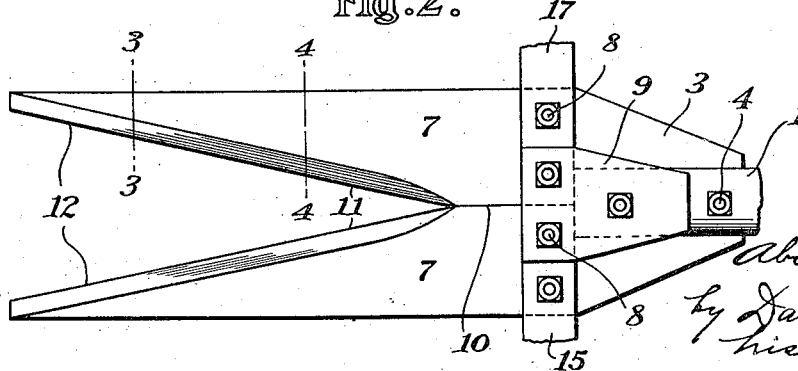

UNITED STATES PATENT OFFICE.

ABRAM E. CRANE, OF FAIRPORT, NEW YORK, ASSIGNOR OF ONE-HALF TO JAMES T. ENTER, OF FAIRPORT, NEW YORK.

HARVESTER FOR CABBAGE AND SIMILAR PLANTS.

1,241,198.  Specification of Letters Patent.  Patented Sept. 25, 1917.

Application filed May 21, 1917. Serial No. 170,050.

*To all whom it may concern:*

Be it known that I, ABRAM E. CRANE, a citizen of the United States, and resident of Fairport, in the county of Monroe and State of New York, have invented certain new and useful Improvements in Harvesters for Cabbage and Similar Plants, of which the following is a specification.

The present invention relates to harvesters for cabbage and similar plants. An object thereof is to provide a simple and inexpensive construction which will effectively sever the head of the plant from its root without injury to the head, while permitting the latter to be retained by the implement after severing for discharge into any suitable receptacle. Another object of the invention is to provide a harvesting implement in which the cutting edges are arranged on removable blades so constructed that they may be readily resharpened. Still another object of the invention is to construct the implement so that the basket will be supported in a manner that the removal thereof is unnecessary to remove the blades.

To these and other ends, the invention consists of certain parts and combinations of parts, all of which will be hereinafter described, the novel features being pointed out in the appended claims.

In the drawings:—

Figure 1 is a perspective view of the harvesting implement constructed in accordance with the present invention;

Fig. 2 is a view of the under side of the blade showing the connection of the latter to the head at the end of the handle;

Fig. 3 is a section on the line 3—3, Fig. 2; and

Fig. 4 is a section on the line 4—4, Fig. 2.

Referring more particularly to the drawings, 1 indicates the handle of the instrument having a grip 2 at one end, and a head 3 at the other end in the form of a plate bolted to the upper side of the handle 1 at 4 beyond a bend 5 in the handle. This head 3 has a blade-attaching portion 6 at its outer end bent at a slight angle to the body portion, the blade-attaching portion 6 being beyond the end of the handle 1. To the under side of the blade-attaching portion 6, two blades 7 are secured, preferably by bolts 8 and a support or brace plate 9, which is secured to the under side of the handle 1 and projects beneath the blades 7 so as to be held by the two middle screw-bolts 8. The blades 7 project in parallel relation from the head 3 and have abutting portions 10 near their inner ends. From these abutting portions the opposed sides of the blades diverge to form a substantially V-shaped notch between them. Adjacent the base of this notch, the opposed sides are beveled to provide knife edges 11, while near the outer portion of the notch the opposed sides are dull as at 12. In cutting the cabbage head from its root, the blades 7 are caused to be passed on opposite sides of the cabbage root, the dull portions 12 preventing the cutting of the cabbage head during the first part of the placing of the knife about the root. Later the root is engaged by the knife edges 11 and is cut to detach the cabbage head therefrom.

In order to collect or retain the cut head upon the harvester the latter is provided with a basket. In this instance, this basket is formed by a U-shaped member 13, which lies substantially parallel with the plane of the cutting blades 7 above said blades but in rear of the latter, this U-shaped frame opening forwardly and having its ends deflected outwardly at 14, so as to facilitate the passage of the cabbage into the frame and on to the head 3 after the cabbage has been severed from its root. The U-shaped frame 13 is preferably supported by three arms 15, 16 and 17, which extend outwardly from the head and thence upwardly, connecting with the U-shaped frame on the outer side of the latter. The arm 16 is preferably secured by the rivet 4, which connects the plate 3 with the handle 1, while the arms 15 and 17 are secured by the outside bolts 8 which secure the blade 7 to the head 3. It will be noted that the forward ends 14 of the U-shaped frame 13 project forwardly beyond the head 3, and in this way it is possible to receive the cabbage within the basket substantially at the time that the cabbage is severed from its root.

From the foregoing it will be seen that there is provided a harvester for cabbage and the like, in which the root-cutting notch is formed by two blades which are detachably connected to a handle head so that the blades may be removed for the purpose of resharpening. The forward ends of these blades are dull, and do not cut the cabbage while the plates are being fitted about the root. The basket is connected to the head in such a manner that when the plates are removed it will still be maintained on the handle. The basket is so formed that it is inexpensive to manufacture, and at the same time it provides an efficient holder for the cabbage head.

What I claim as my invention and desire to secure by Letters Patent is:—

1. A harvester for cabbage or the like comprising a handle, a head at one end of the handle, two blades each detachably secured to the head at one end and having their opposed sides abutting at their inner ends and diverging toward their free ends, the diverging sides being formed with cutting edges.

2. A harvester for cabbage or the like comprising a handle, a head at one end of the handle, two blades each detachably secured to the head at one end and having edges in proximity to the head in abutment, and edges diverging from said abutting edges, said diverging edges being sharp adjacent the abutting portions and blunt at the free ends of the blades.

3. A harvester for cabbage or the like comprising a handle, a head at one end of the handle, a pair of blades detachably secured to the head and having their opposed sides abutting at their inner ends and diverging toward their free ends, the diverging sides being formed with cutting edges, and a basket supported by the head to permit the removal of the blades.

4. A harvester for cabbage or the like comprising a handle, a head at one end of the handle, a pair of blades detachably secured to the head, a basket supported by the head to permit the removal of the blades, said basket comprising a forwardly-opening U-shaped member with diverging ends, and supporting arms connected to said head and to said forwardly-opening U-shaped member.

ABRAM E. CRANE.

Copies of this patent may be obtained for five cents each, by addressing the "Commissioner of Patents, Washington, D. C."